United States Patent
Flammer et al.

(10) Patent No.: US 8,396,987 B2
(45) Date of Patent: *Mar. 12, 2013

(54) METHOD AND SYSTEM FOR PROVIDING NETWORK AND ROUTING PROTOCOLS FOR UTILITY SERVICES

(75) Inventors: George Flammer, Cupertino, CA (US); Sterling Hughes, Oakland, CA (US); Daniel McKernan, Cupertino, CA (US); Raj Vaswani, Portola Valley, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,288

(22) Filed: Mar. 13, 2012

(65) Prior Publication Data
US 2012/0173758 A1    Jul. 5, 2012

Related U.S. Application Data

(63) Continuation of application No. 12/820,636, filed on Jun. 22, 2010, now Pat. No. 8,161,191, which is a continuation of application No. 11/818,886, filed on Jun. 15, 2007, now Pat. No. 7,769,888.

(51) Int. Cl.
*G06F 15/173* (2006.01)

(52) U.S. Cl. ........ 709/238; 709/239; 709/240; 370/238; 340/870.01; 340/870.02

(58) Field of Classification Search .......... 709/238–244; 370/238; 340/870.01, 870.02
See application file for complete search history.

(56) References Cited

U.S. PATENT DOCUMENTS

| | | |
|---|---|---|
| 6,381,656 B1 | 4/2002 | Shankman |
| 6,442,144 B1 | 8/2002 | Hansen et al. |
| 6,980,973 B1 | 12/2005 | Karpenko |
| 6,985,087 B2 * | 1/2006 | Soliman ............... 340/870.02 |

(Continued)

FOREIGN PATENT DOCUMENTS

| WO | WO 98/51118 A1 | 11/1998 |
|---|---|---|
| WO | WO 2007/081566 A2 | 7/2007 |

(Continued)

OTHER PUBLICATIONS

Non-blocking, localized routing algorithm for balanced energy consumption in mobile ad hoc networks Kyungtae Woo. Modeling, Analysis and Simulation of Computer and Telecommunication Systems, 2001. Proceedings. Ninth International Symposium on Digital Object Identifier: 10.1109/MASCOT.2001.948860 Publication Year: 2001, pp. 117-124.*

(Continued)

*Primary Examiner* — Wing F Chan
*Assistant Examiner* — Razu Miah
(74) *Attorney, Agent, or Firm* — Buchanan Ingersoll & Rooney PC

(57) ABSTRACT

A method and system of operating a utility node to communicate in a wireless utility network are provided. A utility node in the wireless utility network discovers at least two access points each respectively constituting an interface between a wide area network and the wireless utility network. The node discovers at least two access points constituting an interface between the two networks, registers with the discovered access points, and obtains at least two unique network addresses each respectively associated with a corresponding one of the access points with which the node has registered. The node provides the at least two addresses to a back office server which is communication with the wide area network to provide the back office server with at least two routes to reach the node. The at least two routes are respectively associated with a corresponding one of the access points with which the node registered.

20 Claims, 20 Drawing Sheets

U.S. PATENT DOCUMENTS

| | | | |
|---|---|---|---|
| 7,231,459 B2 | 6/2007 | Saraph | |
| 7,310,052 B2 | 12/2007 | Bowman | |
| 7,406,032 B2 | 7/2008 | Li et al. | |
| 7,414,978 B2 | 8/2008 | Lun et al. | |
| 7,602,735 B2 * | 10/2009 | Cheon et al. | 370/254 |
| 7,720,993 B2 | 5/2010 | Liu et al. | |
| 7,738,416 B2 * | 6/2010 | Wandel | 370/328 |
| 7,768,926 B2 | 8/2010 | Bellur et al. | |
| 2002/0013856 A1 | 1/2002 | Garcia-Luna-Aceves et al. | |
| 2003/0028651 A1 | 2/2003 | Schreckengast et al. | |
| 2003/0058798 A1 | 3/2003 | Fleischer et al. | |
| 2004/0103275 A1* | 5/2004 | Ji et al. | 713/150 |
| 2004/0170125 A1 | 9/2004 | O'Neill | |
| 2005/0111375 A1 | 5/2005 | Ravindran et al. | |
| 2005/0135309 A1 | 6/2005 | Hester et al. | |
| 2005/0138200 A1 | 6/2005 | Liu et al. | |
| 2006/0059434 A1 | 3/2006 | Boss et al. | |
| 2006/0146716 A1 | 7/2006 | Lun et al. | |
| 2006/0171403 A1 | 8/2006 | Kim et al. | |
| 2006/0215582 A1 | 9/2006 | Castagnoli et al. | |
| 2007/0008171 A1 | 1/2007 | Bowman | |
| 2007/0038743 A1 | 2/2007 | Hellhake et al. | |
| 2007/0120705 A1 | 5/2007 | Kiiskila et al. | |
| 2007/0121486 A1 | 5/2007 | Guichard et al. | |
| 2007/0127393 A1 | 6/2007 | Car | |
| 2007/0136788 A1 | 6/2007 | Monahan et al. | |
| 2007/0211636 A1* | 9/2007 | Bellur et al. | 370/238 |
| 2007/0258473 A1* | 11/2007 | Ruffino et al. | 370/401 |
| 2010/0157838 A1 | 6/2010 | Vaswani et al. | |

FOREIGN PATENT DOCUMENTS

| | | |
|---|---|---|
| WO | WO 2008/094296 A1 | 8/2008 |
| WO | WO 2008/097446 A1 | 8/2008 |

OTHER PUBLICATIONS

Partial International Search Report issued in International Application No. PCT/US2008/00670 dated Oct. 15, 2008.

International Search Report and Written Opinion issued in International Application No. PCT/US2008/00670 dated Mar. 4, 2009.

Bai et al., BRICS: A Building-block approach for analyzing Routing protocols in ad hoc networks—a Case Study of reactive routing protocols, IEEE Communications Society, 2004, pp. 3618-3621.

Woo et al., Non-Blocking, Localized Routing Algorithm for Balanced Energy Consumption in Mobile Ad Hoc Networks, 2001, IEEE, pp. 117-124.

International Search Report and Written Opinion corresponding to PCT/US 2008/008698 dated Oct. 17, 2008.

Hungarian Patent Office Search Report dated Aug. 19, 2010.

* cited by examiner (SPECIFIC NETWORK ELEMENTS SHOWN IN FIGURE 1A)

400

Network1] →

[Egress Node →

[(Next Hop1) (flag) (Link Cost) (Path Cost) ]

[(Next Hop2) (flag) (Link Cost) (Path Cost)]

[ ..... ].

[(Next HopN) (flag) (Link Cost) (Path Cost)]

[Network2] →

[Egress Node →

[(Next Hop1) (flag) (Link Cost) (Path Cost)]

[(Next Hop2) (flag) (Link Cost) (Path Cost)]

[ ..... ]

[(Next HopN) (flag) (Link Cost) (Path Cost)]

500

| Destination Address | Type |
|---|---|
| Destination 1, Hop1, Hop2, ...HopN | Source-routed |
| Destination 2 | Direct adjacency |
| Destination 3, Next Hop 1 | Hop-by-hop |
| Destination 4, Hop1, Hop2, ...HopN | Source-routed |
| Destination 4, Next Hop | Hop-by-hop |
| Destination 4, Hop 5 | Bread-crumb |

FIGURE 5

```
|-------------------------------------- 32 bits ---------------------------------------|
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
| Ver   | Type    | Reserved    |M|    Seq      |    Message    |
|       |         |             | |   Number    |    Number     |
+-+-+-+-+-+-+-+-+-+-+-+-+-+-+-+-+-+-+-+-+-+-+-+-+-+-+-+-+-+-+-+-+
|              AREG Neighbor 1                  |     AREG      |
|                                               |  Neighbor 2   |
+-+-+-+-+-+-+-+-+-+-+-+-+-+-+-+-+-+-+-+-+-+-+-+-+-+-+-+-+-+-+-+-+
|           AREG Neighbor 2        |      AREG Neighbor 3       |
|                 (cont)           |                            |
+-+-+-+-+-+-+-+-+-+-+-+-+-+-+-+-+-+-+-+-+-+-+-+-+-+-+-+-+-+-+-+-+
|AREG neighbor 3|       AREG Neighbor ...                       |
|    (cont)     |                                               |
+-+-+-+-+-+-+-+-+-+-+-+-+-+-+-+-+-+-+-+-+-+-+-+-+-+-+-+-+-+-+-+-+
```

[Network1] →

[Egress Node AP2(1021) →

[(Next Hop R2(1032))    (30)    (20)]

[Egress Node AP2(1022) →

[(Next Hop R3(1033))    (15)    (40)]

FIGURE 13

|  | Network1 (1510) | AP1 (1521) | AP2 (1522) | R1(1531) | R2(1532) | M1(1541) | M2(1542) | M3(1543) |
|---|---|---|---|---|---|---|---|---|
| Network1(1510) |  | 5 | 10 |  |  |  |  |  |
| AP1(1521) | 5 |  |  | 10 |  |  |  |  |
| AP2(1522) | 10 |  |  |  | 10 |  |  |  |
| R1(1531) |  | 10 |  |  | 20 | 15 | 20 |  |
| R2(1532) |  |  | 10 | 20 |  | 20 | 10 |  |
| M1(1541) |  |  |  | 15 | 20 |  |  | 10 |
| M2(1542) |  |  |  | 20 | 10 |  |  | 30 |
| M3(1543) |  |  |  |  |  | 10 | 30 |  |

| Notation | Definition |
|---|---|
| Net1 | Network1 (1510) |
| -> | Route Advertisement e.g. AP1 -> R1 indicates AP1's advertisement to R1 |
| NH | Next Hop |
| @ n | path cost of n |
| @ n , m | path cost of n, hop count of m |
| / | "through" e.g. Net1/AP1 indicates Network1 through AP1 |
| RT | Routing Table |

| Step 1: AP1(1521), AP2(1522) come up |
|---|
| AP1(1521) brings up Net1 @ 5 |
| AP2(1522) brings up Net1 @ 10 |

| Step 2: R1(1531) Boots |
|---|
| AP1(1521) -> R1(1531) : Net1/AP1(1521) @ 5 |
| R1(1531) adds Net1/AP1(1521) NH AP1(1521) @ 15 , 1 to RT |

| Step 3: R2(1532) Boots |
|---|
| AP2(1522) -> R2(1532) : Net1/AP2(1522) NH AP2(1522) @ 10 , 1 |
| R1(1531) -> R2(1532) : Net1/AP1(1521) NH R1(1531) @ 15 , 2 |
| R2(1532) adds Net1/AP2(1522) NH AP2(1522) @ 20 , 1 to RT |
| R2(1532) adds Net1/AP1(1521) NH R1(1531) @ 35 , 2 to RT |
| R2(1532) -> R1(1531) : Net1/AP2(1522) NH R2(1532) @ 20 , 2 |
| R1(1531) adds Net1/AP2(1522) NH R2(1532) @ 40 , 2 as second entry to RT |
| -- Note the notion of sorting routes by preference. |

| Step 4: M1(1541) Boots |
|---|
| R1(1531) -> M1(1541) : Net1/AP1(1521) NH R1(1531) 15 , 2 |
| R1(1531) -> M1(1541) : Net1/AP2(1522) NH R1(1531) 40 , 3 |
| R2(1532) -> M1(1541) : Net1/AP1(1521) NH R2(1532) 35 , 3 |
| R2(1532) -> M1(1541) : Net1/AP2(1522) NH R2(1532) 20 , 2 |
| M1(1541) adds Net1/AP1(1521) NH R1(1531) 30 , 2 to RT |
| M1(1541) adds Net1/AP2(1522) NH R2(1532) 40 , 2 to RT |
| M1(1541) adds Net1/AP2(1522) NH R1(1531) 55 , 3 to RT |
| M1(1541) adds Net1/AP1(1521) NH R2(1532) 55 , 3 to RT |

| Step 5: M2(1542) Boots |
|---|
| R1(1531) -> M2(1542) : Net1/AP1(1521) NH R1(1531) 15 , 2 |
| R1(1531) -> M2(1542) : Net1/AP2(1522) NH R1(1531) 40 , 3 |
| R2(1532) -> M2(1542) : Net1/AP1(1521) NH R2(1532) 35 , 3 |
| R2(1532) -> M2(1542) : Net1/AP2(1522) NH R2(1532) 20 , 2 |
| M2(1542) adds Net1/AP2(1522) NH R2(1532) 30 , 2 to RT |
| M2(1542) adds Net1/AP1(1521) NH R1(1531) 35 , 2 to RT |
| M2(1542) adds Net1/AP1(1521) NH R2(1532) 45 , 3 to RT |
| M2(1542) adds Net1/AP2(1522) NH R1(1531) 60 , 3 to RT |

| Step 6: M3(1543) Boots |
|---|
| M1(1541) -> M3(1543) : Net1/AP1(1521) NH M1(1541) 30 , 3 |
| M1(1541) -> M3(1543) : Net1/AP2(1522) NH M1(1541) 40 , 3 |
| M2(1542) -> M3(1543) : Net1/AP1(1521) NH M2(1542) 35 , 3 |
| M2(1542) -> M3(1543) : Net1/AP2(1522) NH M2(1542) 30 , 3 |
| M3(1543) adds : Net1/AP1(1521) NH M1(1541) 40 , 3 to RT |
| M3(1543) adds : Net1/AP2(1522) NH M1(1541) 50 , 3 to RT |
| M3(1543) adds : Net1/AP2(1522) NH M2(1542) 60 , 3 to RT |
| M3(1543) adds : Net1/AP1(1521) NH M2(1542) 65 , 3 to RT |

METHOD AND SYSTEM FOR PROVIDING NETWORK AND ROUTING PROTOCOLS FOR UTILITY SERVICES

CROSS-REFERENCE TO RELATED APPLICATIONS

This application is a continuation of application Ser. No. 12/820,636, filed Jun. 22, 2010, which is a continuation of application Ser. No. 11/818,886, filed Jun. 15, 2007, which are incorporated by reference herein in their entirety.

FIELD OF THE INVENTION

The field of the invention relates generally to networks and network-based computer systems, and more particularly relates to a method and system for providing network and routing protocols for utility and home area services.

SUMMARY OF THE INVENTION

The example embodiments illustrate a routing scheme and protocols in an RF network (terrestrial or wireless LAN) operating in FHSS mode to enable two-way communications between utility and home devices (such as electric meters, water meters, gas meters, Distribution Automation (DA) devices, and in-premise devices) that are IP hosts in the RF LAN network, interconnecting with the Utility Host System (also referred to as Back Office Server or BOS) which is an IP host in a wireless or wired WAN (Wide Area Network) infrastructure. The IP version in the example embodiment is IPv6. The IPv6 packets are encapsulated in IPv4 for transmission through the typically IPv4-based WAN cloud. The method for routing IPv6 packets in the wireless LAN network includes providing an Access Point (AP) that can perform encapsulation (e.g. of IPv6 into IPv4 packets) in its capacity as the gateway between the LAN and WAN, and providing a plurality of IPv6 endpoints or devices that appear to be directly connected to the AP at the IPv6 level.

Physically, the endpoints or devices are capable of establishing radio transmission paths to the AP directly (single hop to AP) or to other IPv6 devices (multi-hop to AP), and the algorithm and methods of this invention describe how the network topology under the AP is created and packets are routed using the data link layer (Layer 2 in the OSI model). Devices or nodes come up, discover available networks, select the networks to join, choose an ordered set of viable upstream candidates as their next hop in their routing scheme, register with the upstream nodes having the best path and link cost, and ultimately register with the APs associated with one or more of the available networks. The network discovery process conducted by the nodes insures there are routes to forward packets upstream to the AP for egress to the Utility Host System, while explicit registration with the upstream nodes and AP provides the AP with the most current notion of the network and insures that traffic can also flow downstream to the node. This is a multi-egress, multi-ingress routing scheme, where a network node can be part of multiple networks via one or more APs (gateways).

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

FIG. 5 is an example of a list of routes of different route types that may be present at a node.

FIG. 8 is an example format for an "AP registration" message sent by a node to the AP it wishes to register with.

FIG. 13 is a representation of the reordered list of upstream hops generated in the end node M for egress to a Network during the process of route updating in the network depicted in FIG. 13.

FIG. 15 shows the map of link costs between all the nodes that can establish RF communication links with each other in one possible embodiment.

FIG. 16 provides descriptions of the notation used in FIG. 17.

FIG. 17 is a summary of the route determination and propagation process that occurs when a node is booted up in the network of FIG. 14 to get established.

DETAILED DESCRIPTION OF THE PREFERRED EMBODIMENTS

Figure 1A:
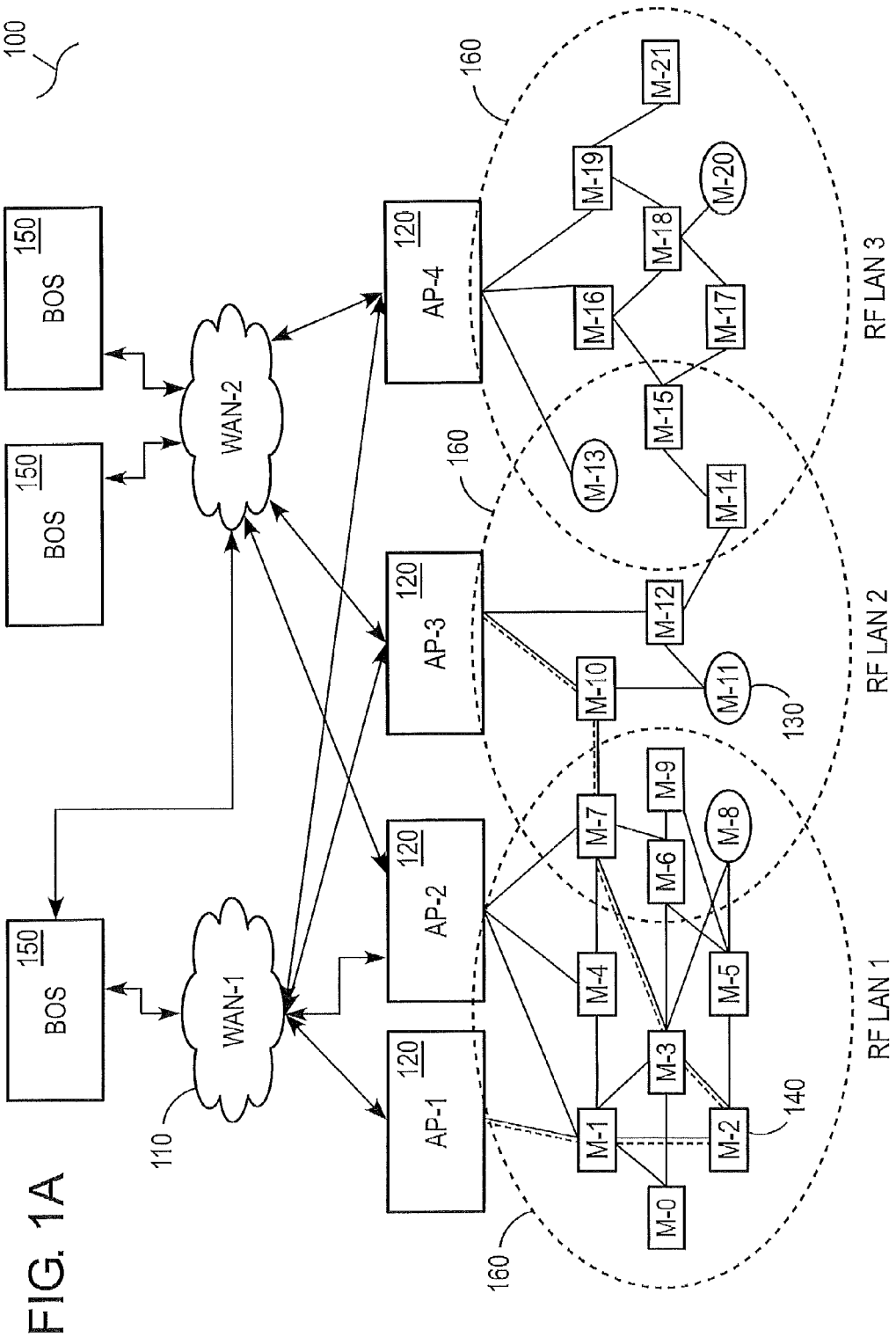
FIG. 1A illustrates the overall network architecture of one possible embodiment.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of serial and parallel steps leading to a desired result. The steps are those requiring manipulations of physical quantities.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specifically constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMS"), EPROMs, EEPROMs, magnetic or optical cards, or any type of media suitable for storing electronic instructions, and each coupled to a computer system bus.

The algorithms, processes, and methods presented herein are not inherently related or restricted to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Wireless Network

Referring to FIG. 1A, a communications network includes a plurality of devices 140 and 130 ("nodes") linked to one another (at least one or more) and to one or more Access Points (APs) within a wireless LAN 160. Unless otherwise noted, APs may be alternatively referred to as "Gateways". The APs in turn may be linked to one or more back office system (BOS) 150 via one or more networks 110, typically Wide Area Networks (WANs). A back office system may be implemented on one or more computing devices, for example a central server such as central server 150 as shown in FIG. 1B, and may be implemented across one or more networks.

Figure 1B:
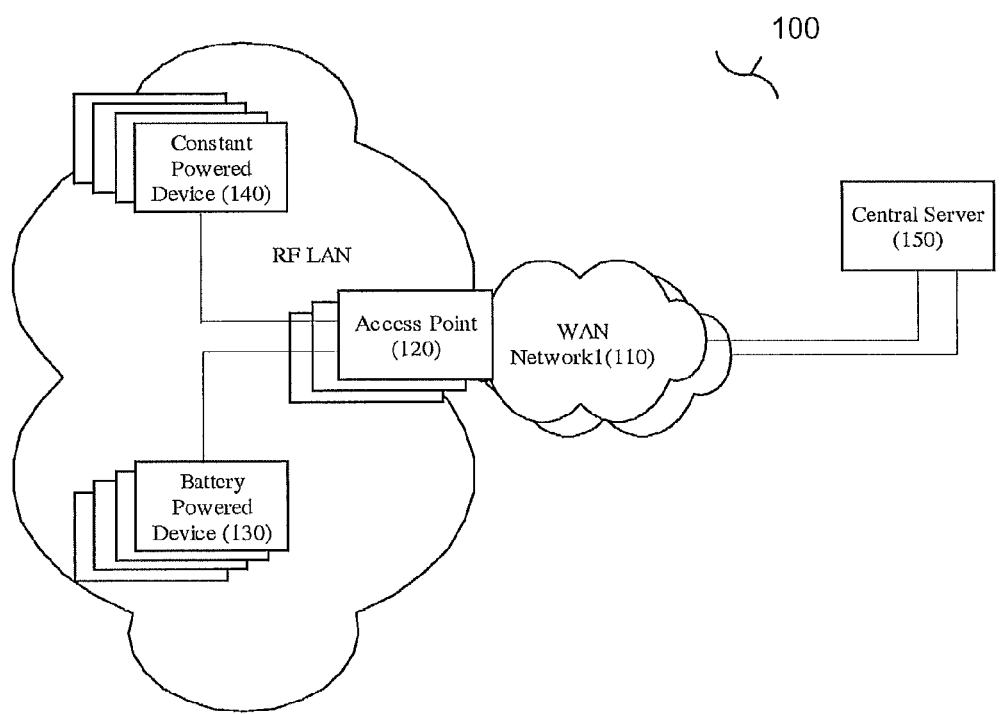
FIG. 1B is alternate representation of the overall network architecture of one possible embodiment.

Referring to FIG. 1B, nodes, such as battery powered devices (BPDs) 130 and/or constant powered devices (CPDs) 140, may discover available networks 110 by listening to all neighbors it can set up links with, may select one they should join, and may choose a set of viable upstream candidates as their next hop. Note that in one presently preferred embodiment, CPDs may act as a proxy for BPDs. However, alternate embodiments may allow BPDs to participate directly as nodes in the wireless network without a proxy.

EXAMPLE 1

Node M-1, a constant powered device 140 in FIG. 1A, hears about the two networks WAN-1 and WAN-2 of the type WAN network 110 (with unique IP addresses) from its neighbors and register with both AP-1 and AP-2 of the type Access Point 120 that provide egress to these WANS. It does this through the upstream nodes M-5, M-6, M-18, M-2 and M-12, of the type Constant Powered Device 140 in order to communicate with BOS-1 of the type Central Server 150. Each of these nodes may construct a routing table with an ordered list of next hops and corresponding link costs (adjacency cost between the local node and the next hop) and the path costs (advertised cost of egress by the next hop). Each node subsequently registers itself with its upstream neighbor and gateway 120. Gateway 120 may keep track of the network topology and capabilities of all devices in its control, and also other devices. Nodes may maintain local state and the states of their immediate neighbors, and may periodically update their registrations.

Wireless Utility Network

The following example embodiment provides for a network-based system and method of monitoring and controlling a utility meter in a utility network.

Figure 1C:
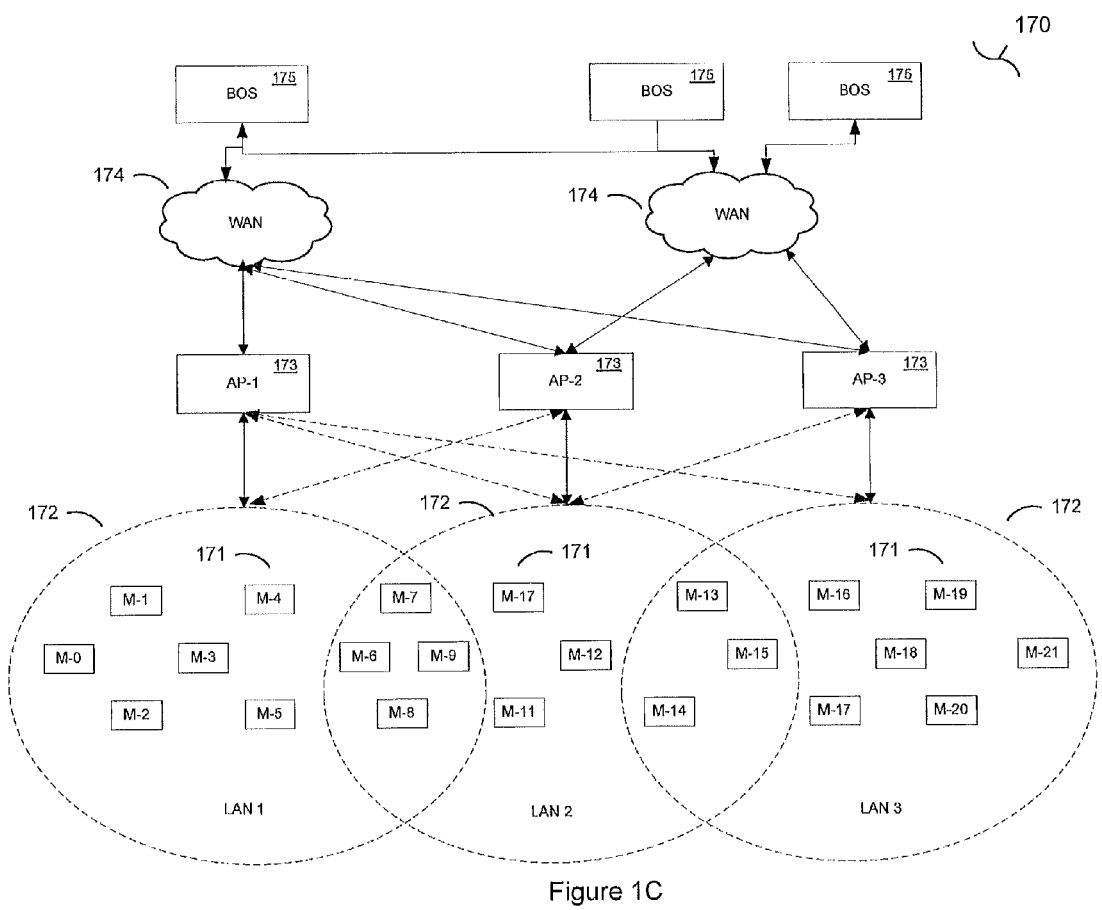
FIG. 1C is a generalized block diagram of a wireless utility network of one possible embodiment.

FIG. 1C is a generalized block diagram of a utility network 170 that may be used to implement embodiments of the present invention. Utility network 170 may include one or more electronic devices 171, or nodes. In a preferred embodiment, the electronic devices 171 may be connected over a wireless local area network (LAN) 172. In the example of a utility network, the LAN may be a neighborhood area network (NAN) corresponding to a neighborhood or service area for the utility. As shown in the example embodiment, multiple LANs may be used, which may or may not overlap, such that a given electronic device can be connected to (or be part of) only one wireless LAN or multiple wireless LANs. The nodes may be any type of electronic device. Examples of electronic devices, or nodes, include utility nodes, which may include a utility meter or may connect to a utility meter. A utility meter is a device which is capable of measuring a metered quantity, typically a commodity like electricity, water, natural gas, etc. Utility nodes which connect to a utility meter may include a network interface card (NIC) for communicating on a network, may include one or more RF transceivers for communicating on one or more wireless LANs, and may include one or more utility meter interface devices (a given utility node may interface with multiple meters, which may or may not meter different commodities, such as electricity, gas, water, etc.). Utility nodes may also include an in-premise device interface to connect to in-premise devices through an in-premise network (which may or may not be a wireless network). In-premise device interface connects to in-premise devices to provide a communications link between the utility node and the in-premise devices. Additionally, the utility node may provide a communications link between the in premise devices and the wireless communications network connected to the utility node. Other examples of electronic devices include communication devices, such as set top boxes (as may be used in cable television or satellite television delivery), household appliances (e.g. refrigerator, heater, light(s), cooking appliances, etc.), computers or computing devices (e.g. game consoles, storage devices, PCs, servers, etc.) networking devices such as relay, gateway, access point, router, or other networking devices, phones or cell phones, battery storage device, transportation devices, transportation vehicles (for example: an electric or hybrid car or other vehicle, which may or may not be able to "plug-in" to a utility grid to receive a metered/monitored commodity such as electricity), entertainment devices (e.g. TVs, DVD players, set top boxes, gaming consoles, etc.), or other devise which may be found in a home, business, roadway or parking lot, or other location. Relays may handle communication between electronic devices 171 and the wireless LAN 172. For example, a relay could provide communication between the electronic device and the infrastructure of the wireless network. Unless otherwise noted, other devices in the network such as meters, electronic devices, gateways, etc. may also perform as relays, and relays may perform the functions of other devices or software on the network.

The wireless LAN 172 may be any type of wireless network, and may use any frequency, communications channel or communications protocol. In one presently preferred embodiment, one or more of the wireless LANs 172 are FHSS (Frequency-Hopping Spread Spectrum) networks.

The LANs 172 are typically connected to one or more access points (AP) 173. A given LAN may be connected to only a single AP, or may be connected to two or more access points. The access points 173 may be connected to one or more wide area networks (WAN) 174. The WANs 174 may be connected to one or more back office systems (BOS) 175. The back office system may handle a variety of business or management tasks, including participation in the collection of metering information, managing metering devices, security for the network, or other functions as may be desired in an AMI network. Examples of back office systems include billing and accounting systems, proxy servers, outage detection systems (as may be used in a utility network), data storage systems, etc.

Nodes within the communications network, which may be a LAN or a WAN, or a combination of both, may communicate using one or more protocols. Nodes may include an electronic device, a relay, an access point, a router, or a BOS. Some nodes may be able to communicate using IPv6, some may be capable of communicating on IPv4, while some may be capable of communicating on either IPv4 or IPv6. Some nodes may be capable of encapsulating IPv6 packets in an IPv4 packet. Additionally, some nodes may be able to establish an IPv4 tunnel through an IPv6 network. The communication between nodes, and the routing and used within the wireless communication network connecting nodes, is described more fully below.

In one presently preferred embodiment a routing protocol used is a hop-by-hop multi-egress/multi-ingress algorithm for determining an optimal route to/from a destination, which may use path cost and/or history of stable upstream and or downstream routing as the metric for determining the next hop for routing a packet. In the presently preferred embodiment, hop counts are not used for evaluating the path cost, but are used to prevent routing loops, as described below. In such an embodiment, a node may select the route with the lowest metric value as the preferred route to transmit packets.

In one presently preferred embodiment, a routing protocol is used in the initial network discovery scanning process by the new node through all slots or channels to get to all (preferably) its neighbors and to get acknowledgement responses and an initial value of link quality estimates to those discovered neighbors. This initial link quality estimate may be used to select a number of best upstream neighbors to talk to (the number selected may be configurable).

Registration of a node with its upstream nodes, in the presently preferred embodiment, means that the node intends to use these upstream nodes for egress to another network. In response to registering with the upstream node the upstream node will add the registering downstream node to the downstream routing table entries maintained by the upstream node. The upstream nodes may also proceed to maintain up-to-date timing information about the registering node in response to the registering by the downstream node. Nodes routing through each other are preferably set up to exchange timing information periodically in order to remain in sync and exchange packets in the RF LAN utilizing FHSS techniques. In the current embodiment, the timing updates piggyback on any data transfer messages, but an explicit timing information exchange may be triggered if there has been no data exchange for a preconfigured interval (for example, on the order of 30 minutes).

The registration of a node with one or more of the APs may then take place. This registration process will preferably prompt the AP to add the registering node to its routing table and insure that the status of the node is up to date. The registration of a node with the AP may occur periodically but more infrequently than the registration with an upstream node. In the presently preferred embodiment, the frequency is on the order of once every 12 hours.

Addressing

IPv6 Addressing:

Each node 130, 140 in the wireless communication network may be identified for end-to-end routing in any particular network by a unique IPv6 address. IPv6 addresses are typically composed of two logical parts: a 64-bit network prefix and a 64-bit host part. Upon successful registration by a node with the AP, the AP may hand the node a set of TLVs (Type Length Value) containing the network configuration, including the IPv6 globally routable prefix associated with the subnet the node is joining. The node may then send a Dynamic DNS update request (RFC 2136) to the Network Host Utility System (BOS) DNS server. When an application server wishes to send traffic into the Wireless LAN, it may resolve the node's DNS name into an IPv6 address for Layer 3 (IP) routing through the WAN to the correct AP. If the WAN is IPv4-based, IPv6 packets may be encapsulated within IPv4 with appropriate prefixes for tunneling through the IPv4 cloud. At the BOS, the received IPv6 packet would be decapsulated.

A node may register with multiple networks either on the same AP or on multiple APs, in which case, it may set the priority order for the networks it belongs to based on its estimation or calculation of the lowest cost path. In the presently preferred embodiment, the node will have an IP address for each network it is registered with. The DNS server may associate these IP addresses with the node's hostname in a preferred order according to the policies defined on the DNS server. When a BOS Server in the WAN network wishes to send traffic into the wireless LAN, the DNS server goes through the candidate IPv6 addresses in order while resolving the node's hostname. As described above, the WAN IPv4 cloud may be traversed by encapsulating the IPv6 Packet at the BOS server in an IPv4 packet with appropriate prefix to enable tunneling.

Link Layer Addressing

Each node 130, 140 may be identified for routing in the Wireless LAN by a unique link layer address assigned to its radio interface. In this embodiment, each node has only a single interface. Other embodiments can have multiple discrete link layer addresses. Link layer addresses are typically 8 bytes long and is the device's MAC address. The link layer broadcast address may be hex ff:ff:ff:ff:ff:ff (all ones). Packets transmitted with this local broadcast address are preferably processed by everyone who receives them.

RF Link Layer Packet Forwarding

Figure 2:
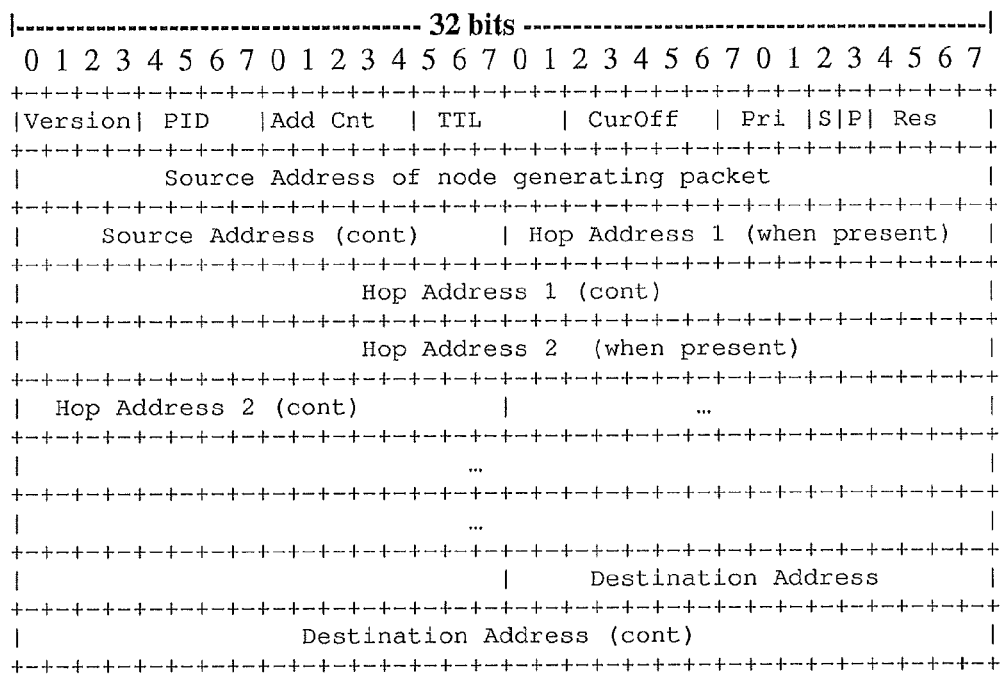
FIG. 2 is a representation of the bit by bit structure of the link layer header of a packet being routed.

FIG. 2 illustrates the bit composition of the link layer header which may carry the information as explained in the table below.

The flags carried by the link layer header shown in FIG. 2 are shown in Table 1:

TABLE 1

| Bit(s) | Name | Description |
| --- | --- | --- |
| 0-3 | Version | Protocol version number. If a higher version is received, the frame is discarded. |
| 4-7 | Protocol Id | Higher layer protocol id:<br>0 x 03: SSN routing protocol<br>0 x 04: IPv4 Networking protocol<br>0 x 06: IPv6 Networking protocol<br>0 x 07: Datalink trace |
| 8-12 | Address Count | Indicates the total number of addresses contained in the data link header, including the source, destination and any intermediate addresses for source routed packets |
| 13-17 | TTL | This is set when the packet is generated. The initial value is set to 'Default TTL' and is configurable. The TTL is decremented every hop that the packet traverses. |
| 18-22 | Current Offset | Set to 0 on packets that don't use source routes. This is set to 0 when the packet is first sent into the network. It is incremented at every hop the packet traverses. |
| 23-25 | Priority | The DLC layer supports 8 levels of priority, this field maps directly to those priorities. |
| 26 | Source Route Bit | Indicates whether the packet contains the entire hop-by-hop route to be used between source and destination. |
| 27 | Preserve Source Route | Set when the L2 forwarding code should preserve elements in the source route when forwarding a packet downstream. If this is not set, the L2 forwarding code may strip out intermediate hop addresses once it has made a forwarding decision. |
| 28-31 | Reserved | Reserved for future use |

As illustrated in FIG. 2, the flags are followed by the source address of the node generating the packet. In the presently preferred embodiment, the source address of the flag can never be set to the broadcast address.

As illustrated in FIG. 2, the source address is followed by the address of the next hop the packet is to be sent to. In the presently preferred embodiment, if the Source Route bit is set then the entire list of hop addresses ending in the destination address is included, otherwise only the one next hop is specified. In either case, the final address is the destination the packet is to be routed to.

If the source route bit is set, the packet header contains the full path the packet will take. Note that a packet can be source routed between two nodes with no intermediate hops (i.e., Add Cnt is 2, and the destination address is either a node or broadcast address). This is a mechanism that may be used to interrogate individual nodes 120, 140 from a terminal such as a debugging mobile station.

If the source route bit is not set, the L2 forwarding code on a node may make a decision based on the value of the Address Count field. For example, if the Address Count is equal to 1 on a packet being sent from the RF LAN towards WAN network (117) or Central Server (150), it means the packet can be forwarded to any egress node or AP in the system. If the Address Count is greater than 1, it means that all additional addresses in the forwarding table at the node are allowable L2 egress destinations. The addresses in the forwarding table for a network are ordered by preference, from least desirable to most desirable.

If the Address Count is greater than 1 the packet can be rerouted to a different L2 destination in case of congestion or failure. When a different L2 destination is chosen, the previous network should be removed (either by decrementing Current Offset or zeroing out the previous field). Removing the previous network is intended to help reduce the occurrence of routing loops, where a packet could be re-injected further away from the destination than the original source.

Preferably, the TTL gets decremented when a packet goes through a node's L2 forwarding. Packets going through L2 forwarding are dropped when the TTL becomes zero; messages with a zero TTL destined to the local host are delivered up the stack. Nodes 130, 140 which are sending messages to the AP (gateway) 120 without using full source route must preferably set TTL to be at least the number of hops on the longest path they have leading to the AP 120. The maximum TTL may be configured by the administrator. In the presently preferred embodiment, packets sent with the destination address set to L2 broadcast are not forwarded.

Delivery of unicast packets is preferably acknowledged by the DLC (Data Link Control) layer. Broadcast packets may be implemented as unicast packets in the FHSS scheme, and are also preferably acknowledged. It is not possible to send unacknowledged unicast packets. When a node 130, 140 sends packets to a neighbor, the MAC layer may report the number of retries and the eventual success of the transmission. The network layer may keep counters of this information on a per-neighbor basis.

Routing Subsystem

In the preferred embodiment, the routing subsystem may be divided into four functional components:
neighbor scan and discovery
neighbor maintenance
node registration with upstream neighbors
node registration with AP The presently preferred embodiment of the routing subsystem utilizes the code entity DLF (Data Link Forwarder) for Layer 2 routing and the code entity MLME (Media Access Control Sub-Layer Management Entity) for acquiring neighbor nodes and maintaining timing information between neighbors. The DLF interfaces to the MLME through a set of APIs.

Neighbor Scan and Discovery

Nodes such as CPD 140 may initiate network discovery when, for example:
It has no viable egress nodes (it is not associated with any APs)
Communications with upstream nodes have been severed, either administratively, or due to part failure or propagation loss
A periodic registration message to one of its APs has failed at least 3 times
A new network is advertised Nodes such as BPD 130 may initiate network discovery, for example, if the link to its nominated master (CPD node 140) has been severed.

In the example embodiments a node discovers neighboring nodes using two basic processes: broadcast discovery and neighbor queries. When a node comes up, the MLME may find all of the node's adjacencies (or directly connected RF links) through a "broadcast discovery process". It may do this randomly to determine when it should start sending broadcast discovery frames and then choosing the channel on which to send the broadcast discovery frame (channel section may be done randomly). It may then cycle through every slot, transmitting each successive broadcast discovery frame on the next slot, wrapping at the last slot. In the preferred embodiment, this process guarantees that a broadcast discovery frame is sent on every channel in the hopping sequence of the FHSS-based network.

In the example embodiments there are two modes to broadcast discovery: aggressive and passive. When powered on, the device may enter aggressive discovery mode where it sends out discovery frames at randomized intervals which may be in the order of milliseconds. It may enter passive discovery mode when the aggressive discovery duration has expired. In passive discovery mode, a node may wait a much longer time between sending broadcast discovery frames, typically of the order of minutes.

Once the discovery process has found a neighbor (adjacency), or a set of neighbors, the MLME may then query the discovered neighbors for their direct neighbors (preferably, all of the direct neighbors will be provided in response). This may be done to discover the network environment more quickly (in contrast to broadcasting a large number of frames in hopes of contacting any one particular device). The neighbor query mechanism is preferably a simple query/response: a node receiving a neighbor query applies the criteria to, preferably, all nodes in its list and, preferably, all the nodes that "match" the criteria are placed in the neighbor response. If no criterion is given, all the nodes in the list may be placed in the neighbor response.

The MLME may notify the DLF when discovery is over i.e. all (preferably) nodes have been queried for their neighbors and an attempt has been made to reach those neighbors.

Using the list of neighbors built up by the MLME the DLF will try and find advertised egress routes. It may accomplish this task by listening for "Network Advertisement" (NADV) messages from the devices in the MLME's neighbor table.

Figure 3:
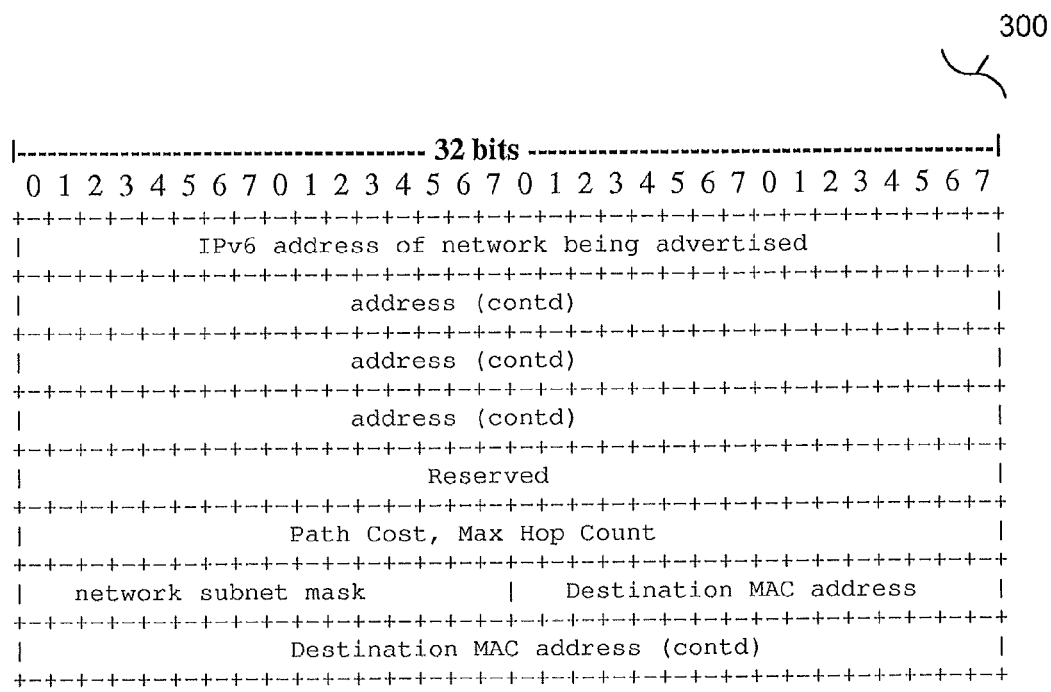
FIG. 3 shows the format of the Network Advertisement message sent out by a node about the best path to a particular network known by it.

The NADV message may advertise a set of egress routes, which may include the path cost and hop count of the egress routes. Path cost is the lowest cost associated with that egress (AP), amongst all candidate paths. Hop count is the highest number of hops that must be taken to reach that egress. Hop count is used to prevent routing loops, and is not used in conjunction with the path cost. The format of the NADV message is shown in FIG. 3. The Destination MAC address is the MAC address of the device the network advertisement is ultimately coming from. In most cases it is the egress point (or the AP) since networks are identified by their egress nodes.

Figure 4:
FIG. 4 is a simplified representation of the routing table constructed at a node after it receives network advertisements from its neighbors.

From the advertisements received in the form of NADV messages, each node can construct a routing table listing the networks available, the egress node (AP) identifying each of the networks, and the available paths to that egress node. Preferably, each of the available paths is described with a next hop, flags describing the type of path, and the link and path costs. The flags indicate the kind of route—whether it is a permanent entry in the table, whether it can be advertised by the node etc. In the preferred embodiment, the node will decide to register with that upstream node for which the total cost (link and path costs) to the network is the least. Other embodiments may use other criteria including validated reliability of the link in providing long-term egress to the network. An example of the information which may be captured in the routing table is laid out in FIG. 4.

From the routing table information, nodes may construct a forwarding or next-hop table with a list of destination MAC addresses, a type associated with each address, and the path cost for it. In the presently preferred embodiment, the type reflects the selection preference associated with the destination and may be one of the five: source-routed, hop-by-hop, direct adjacency, bread-crumb, or local. FIG. 5 provides an example of the route types that may be listed. In the presently preferred embodiment case of a destination of the hop-by-hop type, it is listed along with the next hop from the source node. In the case of a destination of the source-routed type, an array of hops is explicitly stated with the destination in the forwarding table. Multiple entries for the same destination may be listed in the order of preference, which may be determined both by the type flag and the path cost. In the presently preferred embodiment, when trying to reach Destination 4 in the example below, the node will first use one of the hop-by-hop entries that are maintained in a linked list in order of increasing path cost. In other embodiments, the routing algorithm allows for the routing information maintained at the source node to create a source route entry for Destination 4, by structuring a forward set of paths to the destination address. Yet, in other embodiments, the node will use the bread-crumb route it had picked up from passing traffic at some point in time.

Neighbor Maintenance

In the presently preferred upstream and downstream neighbors are constantly maintained via MLME beacons or targeted periodic keepalive messages used for synchronizing the clocks and assuring that nodes can still exchange packets with each other. This constant contact and feedback may be used by the L2 routing layer for multiple purposes, which may include:

Neighbor updates are communicated to downstream devices in timing update beacons.

Nodes use the MLME to detect if their downstream or upstream has gone away.

A node's upstream link characteristics may change, for example, when:

Upstream node goes away

A new preferred upstream is detected

Link quality changes (smoothed over time)

In the presently preferred embodiment, these rules are applied recursively, to all upstream nodes in a path. When an adjustment occurs, the node recalculates the costs to each of its egress nodes. When a node's cost to its upstream significantly changes the cost to one of the networks it routes through, it distributes this information in the next set of MLME beacons to its downstream nodes.

In the presently preferred a change in network information is propagated with a "Neighbor List" message, with the protocol type field set to 0x2 indicating that a partial list of changes is being distributed. In one embodiment, this can reflect adding new networks or changing the cost of existing networks. When an upstream disappears, causing a particular network effectively become no longer routable, a "Neighbor List" message is sent with the protocol type set to 0x3 to indicate that the network has been removed from the upstream nodes network list.

In the presently preferred embodiment, AP's are notified about changes in network topology by the periodic network registration messages that are unicast to it. These messages may be sent by every node within the AP's network, and may contain a complete list of their upstream nodes, and/or the link costs to each of them.

In the presently preferred embodiment, the MLME keeps two smoothed averages that can be used by the DLF for determining link costs for routing purposes: a smoothed RSSI and a smoothed info success percentage. The term "smoothed" refers to the type of averaging done on the data. In the presently preferred embodiment, the averaging uses the formula: smoothed average=A*average+B*sample; B=(1−A). This type of averaging does not require a large amount of memory for storage (as opposed to storing the last N samples) and also has a controllable amount of "history". The term history refers to how much the new value affects the current smoothed average. This may be controlled by the A and B values: large A values mean that the average has more history than smaller A values. Other embodiments can use other averaging techniques that are desirable under the prevalent network conditions.

The RSSI is the received signal strength indicator. This value may be measured for all frames received from a node. In some embodiments it only has limited use in link quality calculations as it may not give a clear indication of the bit error rate of the link. Preferably, when any frame is received from a node, the RSSI of that frame is averaged into the smoothed RSSI using the averaging formula.

In the presently preferred embodiment, the "info" success percentage criterion is used as the best measure of link quality and therefore in making routing decisions. The "info" success percentage is a form of packet success rate. The term "info" is used to denote frames other than the ones that started the communications. The first frame sent to a node targeted on its hopping sequence can fail due to interference or due to the receiver being busy. The info success percentage, in including only those frames that the targeted node is listening for and not the frames at the start of the communications, provides a link quality measure that does not vary greatly with the load of the receiver. The info success percentage is considered to be the best indicator of link quality.

Node Registration with Upstream Neighbors

Each node may explicitly register with the upstream nodes it intends to use in a network. This registration means that the upstream node will now attempt to keep up-to-date timing information about the registering node, and keep a downstream routing table entry. This assures that traffic can not only flow towards the egress, but also back to the node.

The node registers with its upstream node by sending it an "Upstream Register" message. The "Upstream Register" message contains the device's type, and a neighborhood health metric. The neighborhood health metric is used to cull downstream nodes when an upstream becomes overloaded. Devices with a low neighborhood health metric (and therefore presumably low path diversity) are preferentially selected before devices with high neighborhood health metrics.

Figure 6:
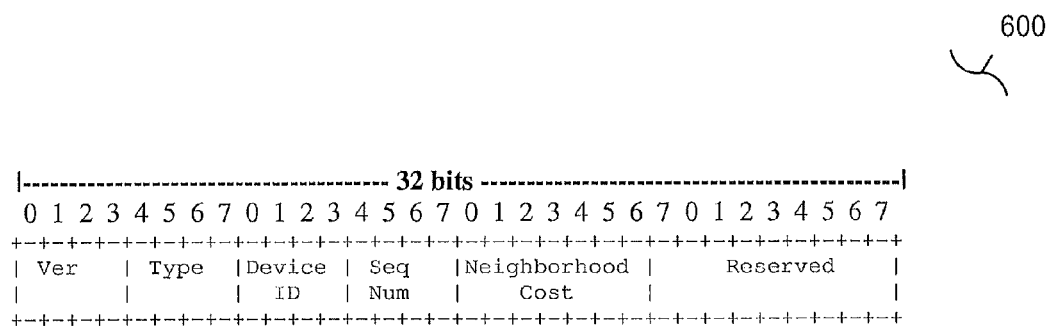
FIG. 6 shows the format for an "upstream registration" message sent by a node to another node upstream.

The format for the "Upstream Registration" message is specified in FIG. 6. The message type indicates it is an upstream registration. The neighborhood cost is the neighborhood health metric based upon a combination of the numbers of potential and active upstream nodes.

Potential upstream nodes either positively or negatively acknowledge "Upstream Register" message using an "Upstream Registration Acknowledgement" message. A device's "Neighborhood Health" is updated based on the value of this acknowledgement. Potential upstream nodes give less weight than acknowledged upstream nodes.

Figure 7:
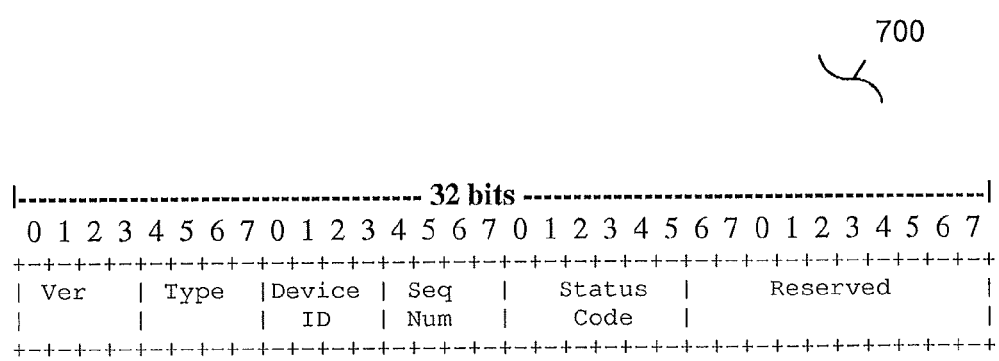
FIG. 7 is an example format for an "upstream registration acknowledgement" message sent by the upstream node to the registering node.

The format for the "Upstream Registration Acknowledgement" message is given in FIG. 7. The type indicates that it is an "Upstream Registration Acknowledgement" message. The "Seq Num" is the sequence number sent by the requestor in the "Upstream Registration" message. The status code of the response can be one of the following:
  0x0, Node successfully added
  0x1, Node failed to be added
  0x2, Node rejected due to high load
  0x3, Node is already being maintained
  Node Registration with AP A node registers itself with an AP by sending a unicast "AP Register" message (AREG). The AREG message contains the list of addresses of nodes in the AP's network that the registering node uses as upstream nodes, and the link cost associated with each of these upstream nodes. It may also contain a list of other candidate networks (represented by the egress nodes of those networks), and their cost.

The format of the AREG message is given in FIG. 8. The Type is set to indicate it is an AREG message. The M bit is set if there is more data to send. Seq Number is the sequence number of the registration message. Message number is used when the registration message is sent in multiple parts. Each AREG Neighbor describes an upstream node in the paths used by the registering node.

Figure 9:
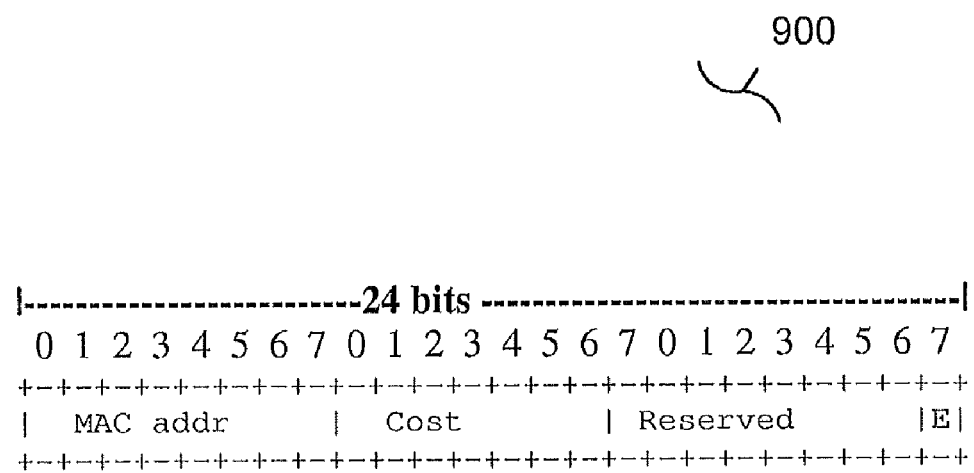
FIG. 9 further illustrates the contents of the AREG neighbor description contained within the "AP registration" message.

The format for a AREG Neighbor description within the AREG message is given in FIG. 9. The MAC address corresponds to the upstream node or a network egress point that the registering node is informing the AP about. Cost is the recorded cost to either the upstream node or the network egress point being described. The E bit is the Network Egress Node bit. It is set if the neighbor description represents a network egress node and not an upstream neighbor.

When the node is successfully registered with the AP, the AP will place the node in its routing table, and make sure it keeps up to date state on the node. The node sends periodic registration messages to the AP (on the order of every 12 hours.) The AP will update its routing table when it sees subsequent AP registration messages. If the AP misses three consecutive registration messages, the node will be culled from the AP's routing table, and it will need to re-register itself.

In response to a successful first time registration, the AP will preferably send down a set of TLVs containing any network configuration information. This list can include, among other things, the AP's globally routable IPv6 prefix, AP's MAC address, DNS server address, network transmission timers and any other variables relating to L2/L3 routing.

If an AP becomes overloaded with too many nodes it can begin to cull nodes that have other candidate networks. It may evaluate this by looking at the different networks reported in the AREG messages, and may remove the healthiest candidates from the network.

Figure 10:
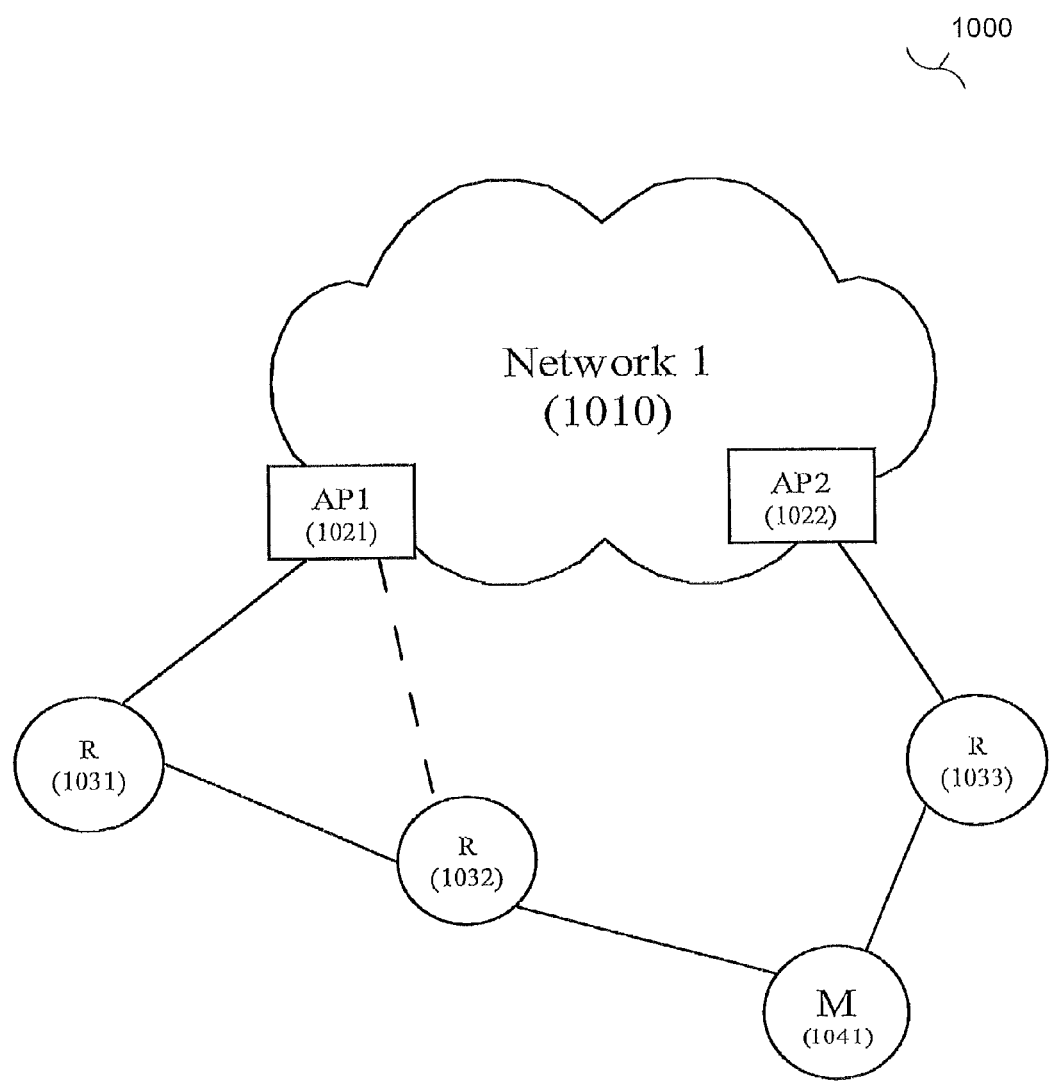
FIG. 10 shows a network where an end-node is connected via multiple relays to more than one APs providing egress into one WAN network.
Figure 11:
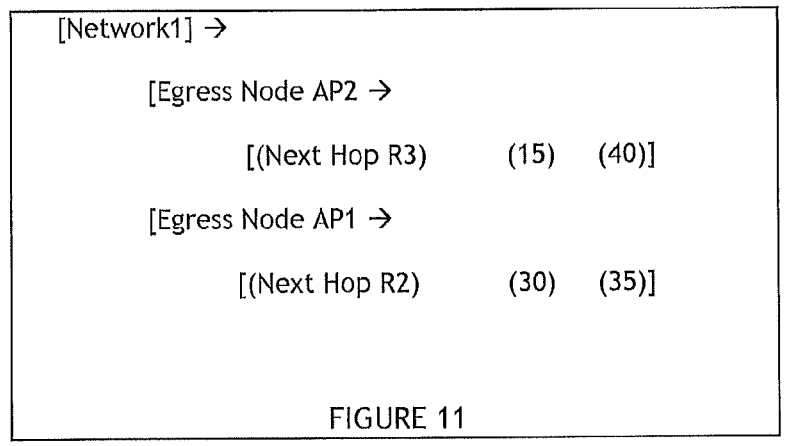
FIG. 11 is a representation of the ordered list of upstream hops generated in the end node M 1041 for egress to Network during the process of coming up in the network depicted in FIG. 10.

The presently preferred process of a node coming up can be summarized as follows using the FIGS. 10 and 11. FIG. 10 shows the layout of the network with AP1 1021 and AP2 1022 providing egress to Network 1 1010. Relays R1 1031, R2 1032, and R3 1033 and Access Points AP1 and AP2 are assumed to be already up. M1 1041 is the first end-node whose process of coming up in the network is described below. Table 2a and 2b lists the link costs of all the links that are detected and established.

TABLE 2a

|  | Network1 1010 | AP(1021) | AP(1022) | R(1031) | R(1032) | R(1033) | M(1041) |
|---|---|---|---|---|---|---|---|
| Network1 1010 |  | 5 | 10 |  |  |  |  |
| AP(1021) | 5 |  |  | 20 | 40 |  |  |
| AP(1022) | 10 |  |  |  |  | 30 |  |
| R(1031) |  | 20 |  |  | 10 |  |  |
| R(1032) |  | 40 |  | 10 |  | 10 | 30 |
| R(1033) |  |  | 30 |  | 10 |  | 15 |
| M(1041) |  |  |  |  | 30 | 15 |  |

TABLE 2b

| Link | Link Cost |
|---|---|
| AP(1021)↔Network(1010) | 5 |
| AP(1022)↔Network(1010) | 10 |
| R(1031)↔AP(1021) | 20 |
| R(1031)↔R(1032) | 10 |
| AP(1021)↔R(1032) | 40 |
| R(1032)↔R(1033) | 10 |
| AP(1022)↔R(1033) | 30 |

When M1 (1041) comes up, MLME neighbor scan discovers R2 (1032) and R3 (1033) adjacency in the first step. Upon establishment of adjacency, R2 (1032) and R3 (1033) send Network Advertisement messages. Specifically, in the second step, R2 (1032) sends a Network Advertisement message advertising one egress route to Network 1 (1010) via AP1 (1021). The message contains the MAC Address of AP1 (1021), the network address class or subnet mask (IPv6 or IPv4 address), the adjacency cost to M1 (1041) as seen by R1 (1031), the maximum number of hops it takes to reach the egress node (2), and the lowest cost of the path out to the network (35). Using a short notation, we can state [R2 (1032) sends NADV (30, MAC_ADDRESS (AP1 (1021)), 2, 35)]. It is to be noted that R2 (1032) does not advertise the direct route it has to AP1 (1021) because the path cost is 45 which is greater than 35. Next, in the third step, R3 (1033) sends NADV message in response advertising one egress route via AP2 (1022). In the short notation we can write [R3 (1033) sends NADV (15, MAC_ADDRESS (AP2 (1022)), 1, 40)]. This is followed in the fourth step by M1 (1041) calculating the total cost of networks by adding the path cost and link cost and creating an ordered list of next upstream hops to use. Upstream node R3 (1033) has a total cost of 55 while upstream node R2 (1032) has a total cost of 65. R3 (1033) is therefore preferred and placed above R2 (1032) in the list as indicated in the tables 2a and 2b above. In the fifth step, M1 (1041) attempts to register with R3 (1033) by sending an Upstream Registration message to R3 (1033), reporting no other possible node for this egress. The sixth step occurs when R3 (1033) sends an Upstream Registration Acknowledgement message to M1 (1041) accepting M1 (1041). M1 (1041) is accepted because it has no other potential node for this egress. This is followed by the seventh step where M1 (1041) attempts to register with R2 (1032) by sending an Upstream Registration message to R2 (1032), reporting no other possible node for this egress. Next comes the eighth step where R2 (1032) sends an Upstream Registration Acknowledgement message to M1 (1041) accepting M1 (1041). M1 (1041) is accepted because it has no other potential node for this egress. In the ninth step, M1 (1041) attempts to register with AP2 (1022) by sending AP Registration Message. It reports R3 (1033) as an upstream node it intends to use. The tenth step follows where AP2 (1022) accepts M1 (1041) by sending AP Registration Acknowledgement Message and passes M1 (1041) the network configuration (notably IPv6 address, DNS address, AP2 (1022)'s network prefix). AP2 (1022) can now route to M1 (1041).

The next step or the eleventh step is where M1 (1041) attempts to register with AP1 (1021) by sending AP Registration Message. It reports R2 (1032) as an upstream node it intends to use.

In the twelfth step, AP1 (1021) accepts M1 (1041) by sending AP Registration Acknowledgement Message and passes M1 (1041) the network configuration (notably IPv6 address, DNS address etc, AP1 (1021)'s network prefix). AP1 (1021) can now route to M1 (1041) as well. Next, in the thirteenth step, M1 (1041) sends a Dynamic DNS (RFC 2136) UPDATE message to the Network1 DNS server with its IPv6 address through AP2 (1022). The last step occurs when M1 (1041) sends a Dynamic DNS (RFC 2136) UPDATE message to the Network1 DNS server with its second IPv6 address through AP1 (1021).

Figure 12:
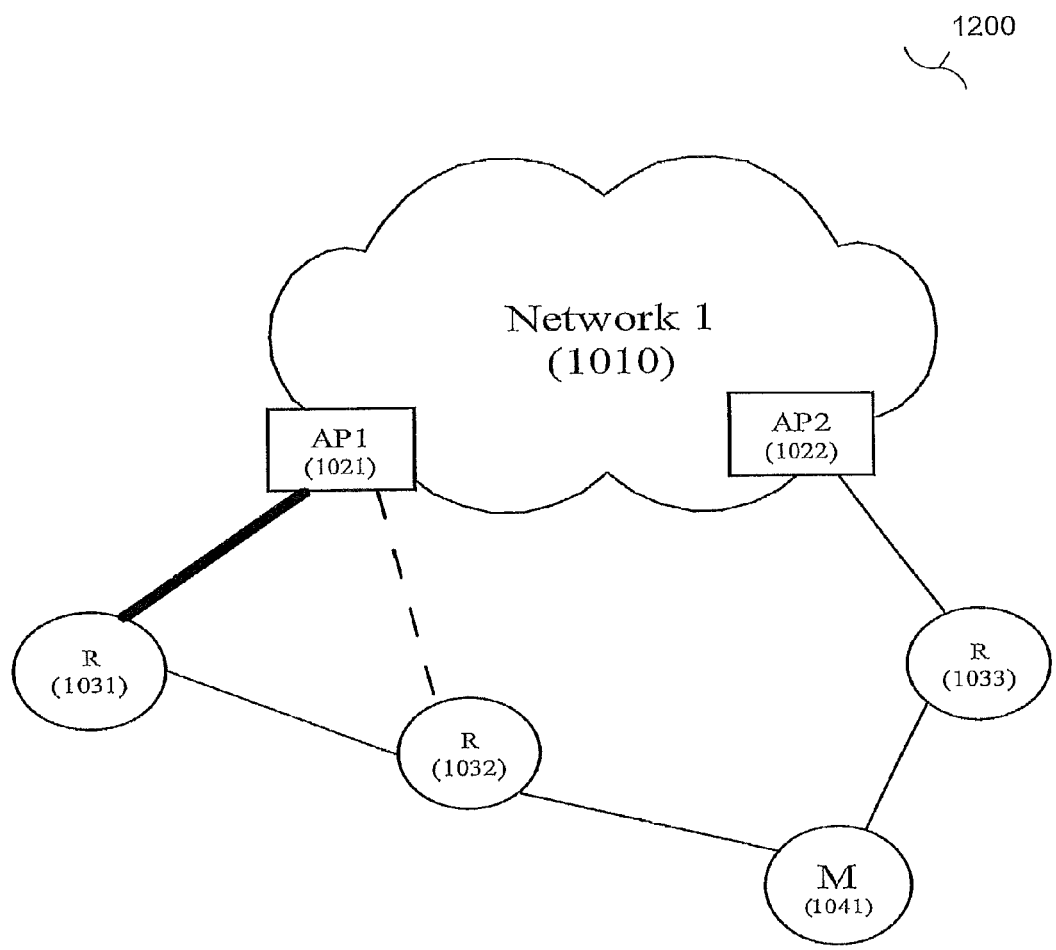
FIG. 12 depicts the network of FIG. 11 where a change in one of the link costs has occurred.

The method for updating routes when a change occurs in the network is illustrated using an example of a link cost changing in the network of 1000. The changed network is depicted in FIG. 12 with the only difference being the dark line indicating that the cost of the path from R1 (1031) to AP1 (1021) has changed from 20 to 5.

First, R1 (1031) updates R2 (1032) via MLME because R2 (1032) uses R1 (1031) as an upstream to AP2 (1021). R2 (1032) re-computes its cost to AP2 (1021). The cost is now 15. R2 (1032) updates M1 (1041) via MLME about the new path cost which is 20. M1 (1041) then recalculates total cost of networks by adding the path cost and link cost and creates a reordered list of next upstream hops to use. Upstream node R3 (1033) has a total cost of 55 while upstream node R2 (1032) has a total cost of 50. R2 (1032) is therefore preferred now and placed above R3 (1033) in the list. The re-ordered list of route information is shown in FIG. 13. Finally, R1 (1031), R2 (1032), and M1 (1041) sends the updated information to both AP2 (1021) and AP2 (1022) via their next periodic AP Registration message.

Figure 14:
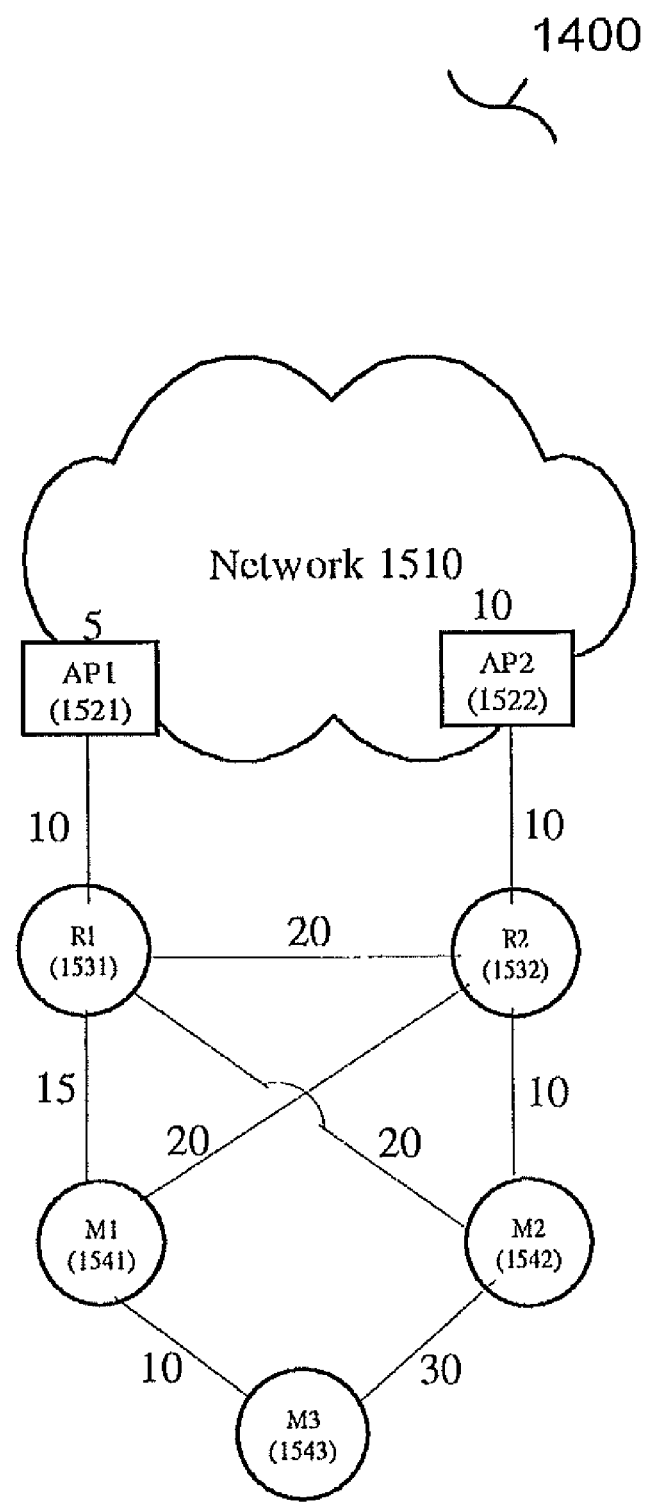
FIG. 14 represents a sample network where multiple APs s, relays and end-point devices come up one by one.

A small-scale RF network depicted in FIG. 14 will next be used to illustrate the preferred embodiment of how the route determination and propagation works in a typical scenario where the Access Points (series 1520) and relays (series 1530) are brought up first and then end-points (series 1540) are turned up. As illustrated in FIG. 15, the link costs are mapped between nodes that establish communications with each other in the RF layer. FIG. 16 is used in conjunction with FIG. 17 to illustrate the preferred embodiment wherein a complete sequence of exchanges occur between the nodes to establish routes or paths for delivery of packets upstream into the advertised network or downstream from the advertised WAN network into the RF network.

It is to be noted that in Step 4 of FIG. 17, R2 (1532) never advertises the 3-hop route for Net1 through R1 (1531) back up to R1 (1531). This technique of not advertising routing information back along a path already traversed is called "split horizon" technique and prevents routing loops.

In one presently preferred embodiment the routing mechanism is adapted to be compatible with, and take advantage of, the Frequency-Hopping Spread Spectrum (FHSS) access scheme used in the wireless network of the preferred embodiment, and leverage some of the inherent operational features of FHSS. Regular timing updates are necessary in the frequency hopping technique to address clock drifts at various nodes which need to remain in synch to synchronously exchange packets. The routing protocol keeps packet overhead to a minimum by using the frequency hopping timing updates as "keep-alive" messages for sending link status information. Alternately, timing updates can also piggyback on any data packets that are forwarded. Unless otherwise noted, keep alive messages are messages sent to update information, and may be sent regularly. "I'm alive" messages, which may also be used to update routing information, are typically sent to announce, for example when a node is initially powered on or introduced into a network.

In such an embodiment there can be no broadcast in the conventional sense in the routing protocol on a network utilizing FHSS scheme. Nodes are targeted directly one by one for packet exchange. The routing protocol in this invention disclosure uses an abstraction of a broadcast whereby the link layer broadcast frame using the 8-byte MAC address of all ones (ff:ff:ff:ff:ff:ff in hex) is transmitted on every slot or channel starting at a randomly chosen slot and with a predetermined wait time between each transmission.

In the preferred embodiment of the disclosed invention, the routing protocol described herein uses beaconing capability in an FHSS-based wireless network where a beacon is a periodic broadcast on a certain known frequency hopping sequence that all neighbors can recognize. The broadcast beacon which can be received by multiple neighbors is much more efficient than sending a routing update to each neighbor. A beacon is also a shorter transmission with lower overhead than a routing update as there are no acknowledgement messages and therefore less re-transmission packets upon failure.

In one presently preferred embodiment the routing protocol described herein is designed to exploit the collective computing resources of the devices (nodes) in the network instead of relying on one gateway at the root of the wireless network to calculate and distribute routes to all nodes. The end-point selects a preferred set of an ordered multiplicity of upstream nodes to use as next hops to go out to a WAN network through multiple Access Points (also referred to as gateways) based upon the egress route advertisements with the associated path costs for each route and each hop. Upon failure of the primary route upstream or to the Access Point, the fall back to secondary routes and/or Access Points in the end-point's database is immediate without any wait for a routing algorithm to re-converge since the routes are already pre-converged.

In one presently preferred embodiment, the routing protocol allows nodes to migrate from one WAN network to another WAN network. When an upstream node advertises its known routes to a downstream node, it sends out a set of egress routes to all available WAN networks. The routing table at each node lists next hops through multiple Access Points for all available WAN networks, making a quick migration possible in case of the primary or default network becoming unavailable.

In one presently preferred embodiment, each node registers itself with all the upstream nodes it intends to use. The upstream node can now keep a downstream routing table entry for that node. Traffic destined for an end-point can now be routed primarily hop by hop where only the next hop from the source or any node subsequently is added to the message header of the packet. Of course, the destination address is routinely included. Source routing where the entire ordered list of nodes through which the packet has to pass is explicitly stated by the gateway in the message header is also within the scope of this algorithm. The routing protocol disclosed in this invention allows each node to have multiple next hops in its knowledge base and gives it the ability to choose from them for hop-by-hop forwarding. By doing so, the packets can circumvent problematic links without transmission failures and retransmissions, and is far more advantageous in a wireless network where the RF links tend to be transient in nature. In addition, the current invention avoids open-ended route discovery loops that source routing techniques are forced into in the presence of failed links.

The example routing protocol described herein has provisions for "breadcrumb" routes which are alternate routes gleaned by a node from traffic passing through it. "Breadcrumb" routes are discarded from the node's routing table when the allocated memory is full and when they turn stale after a specified amount of time. These routes, which are in addition to advertised routes, serve to expand the list of redundant links available to a node for ensuring successful transmission of a packet.

The example routing protocol described herein enables the sorting and preferential ordering of next hops available to a node to route packets to a destination in an IPv6 network. The sorting logic may vary in different implementations. In the current embodiment, the sorting logic uses both the origin of the route information as well as the path cost to the destination and link cost to the desired hop. For example, a next hop picked up from a "bread-crumb" route that was gleaned from passing traffic using an infrequent path is given less preference than a next hop tagged as being used frequently in "hop-by-hop" traffic. Multiple next hops within the "breadcrumb" category or the "hop-by-hop" category would be sorted into an ordered list according to the path cost. There are other options available for route selection, and these options are described in the details of this invention.

The example routing protocol described herein allows for extension of the sorting logic to prefer the most recently used link or the link passing the most traffic over a configurable window (and therefore deemed "strong"), thus enabling greater control of traffic flows. To circumvent overloaded links, a measure of current traffic load on each available link to a possible next hop is also considered when a node chooses the best next hop to use.

With a node being allowed to register on multiple networks (resulting in the node getting multiple IP addresses) and the DNS server capable of sorting these IP addresses according to configurable policies for resolving the node's hostname, there is now a method for controlling ingress of traffic into the RF LAN.

Load Balancing & Robust Rollover Mechanism for Routing

Figure 18:
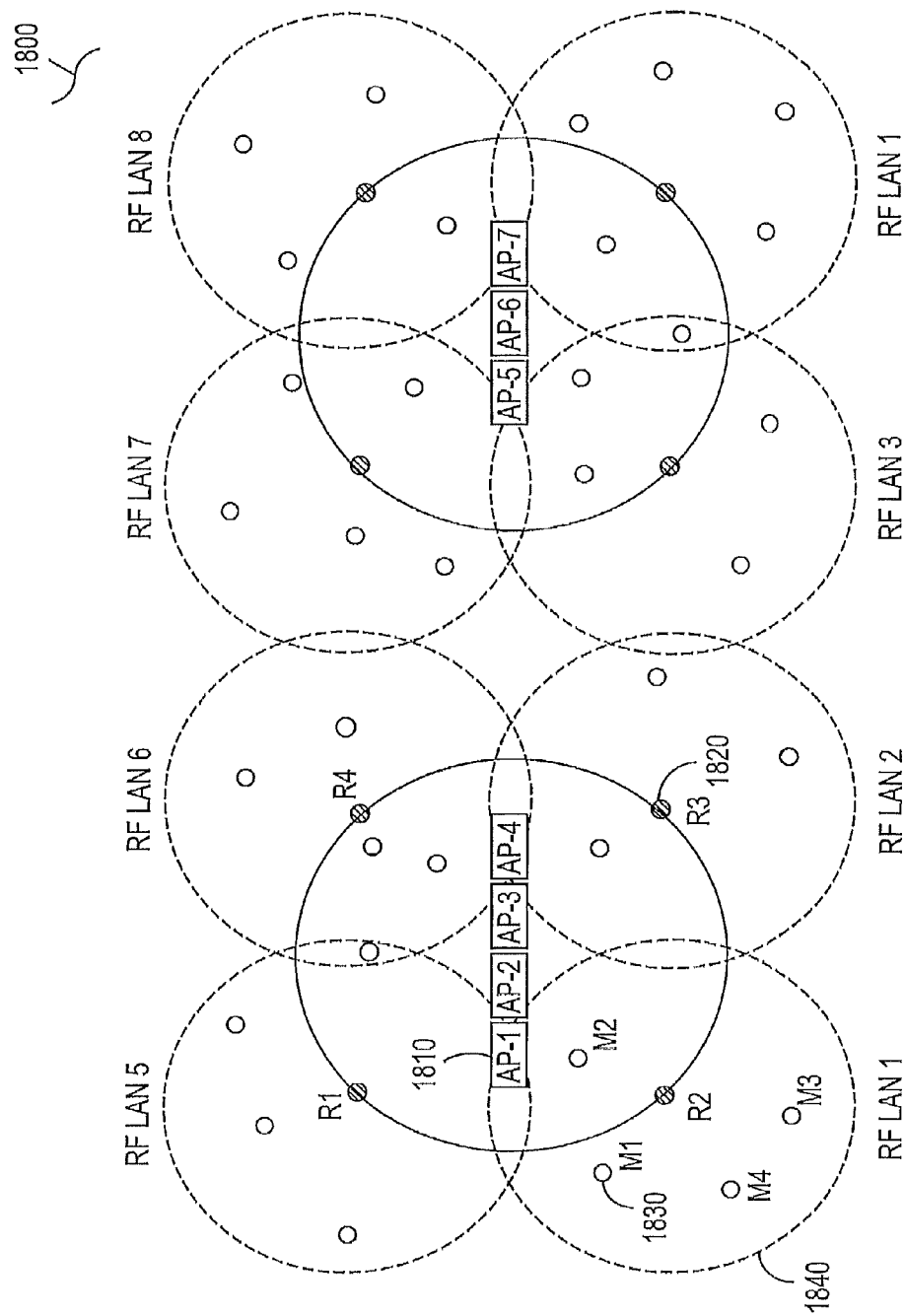
FIG. 18 describes a multiple egress/multiple network configuration for adaptive routing.

FIG. 18 shows a particular network deployment scenario that leverages the routing algorithm described in this application to provide for load balancing and robust rollover mechanisms.

The routing algorithm described herein is particularly adaptable to deployments such as the one illustrated in FIG. 18. The notion of registration with multiple egress points and the notion of configurable link costs may be leveraged to enable several layers of (almost) instantaneous failovers. For example, if AP-1, a device of the Access Point type (1810), fails then the next available AP-2 may be chosen, essentially, immediately. Further, if AP-2 fails, packets could fail over to routes via AP-3, and so on. Consolidating all the APs at a more central location encourages network advertisements of routes through all the APs to the end-point nodes, resulting in registration of these end-point nodes with all the APs instead of one or two APs as in the scenario where the APs are spread out. These routes up to the different APs at the central location look very similar in terms of link costs, insuring that they all make it to the routing table (in the preferred embodiment) of the nodes and thus provide a robust failover mechanism. Relays (1830) may be used to extend the reach of these advertisements for better AP to end-point node ratio. Furthermore, traffic management policies on the APs may be utilized to adjust link or path costs at the Access Points to achieve load balancing or enable resource reservation for certain types of traffic.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

We claim:

1. A wireless local area utility network system, comprising:
   a plurality of utility nodes that are part of a wireless local area utility network, each of the utility nodes being configured to transmit information on a metered commodity;
   a plurality of access points in communication with at least one of the utility nodes in the wireless local area utility network, the access points being in communication with a wide area network and each respectively constituting an interface between the wide area network and the wireless local area utility network; and
   at least one back office system in communication with the wide area network, and configured to communicate with at least one of the plurality of utility nodes via at least one of the access points, wherein at least one of the utility nodes is configured to:
   discover at least two of the access points constituting an interface between the wide area network and the wireless local area utility network;
   register with the discovered access points;
   obtain at least two unique network addresses each respectively associated with a corresponding one of the at least two access points with which the at least one of the utility nodes has registered; and
   provide the at least two unique network addresses to the back office server to provide the back office server with at least two routes to reach the at least one of the utility nodes, and
   wherein the at least two routes are respectively associated with a corresponding one of the at least two access points.

2. The system of claim 1, wherein the utility node obtaining the at least two unique network addresses is configured to:
   upon registering with the at least two access points, receive a corresponding registration acknowledgement message from each of the at least two access points, the registration acknowledgement messages received from each of the at least two access points each containing at least part of a corresponding one of the at least two unique network addresses.

3. The system of claim 2, wherein each of the at least two unique network addresses received in a corresponding one of the registration acknowledgement messages is a combination of a respectively unique first number associated with a corresponding one of the at least two access points and a respectively unique second number associated with the at least one of the utility nodes.

4. The system of claim 2, wherein the at least part of each corresponding one of the at least two unique network addresses received in a corresponding one of the registration acknowledgement messages contains a respectively unique first number associated with a corresponding one of the at least two access points, and
   wherein the utility node obtaining the at least two unique network addresses is configured to combine the respectively unique first number associated with a first one of the at least two access points with a respectively unique second number associated with the at least one of the utility nodes to obtain a first one of the at least two network addresses, and to combine the respectively unique first number associated with a second one of the at least two access points with the respectively unique second number associated with the at least one of the utility nodes to obtain a second one of the at least two network addresses.

5. The system of claim 1, wherein the at least one of the utility nodes is configured to, upon registering with the at least two access points, obtain its network addresses and prefixes each respectively associated with a corresponding one of the access points with which the at least one of the utility nodes has registered.

6. The system of claim 1, wherein the network addresses of the at least one of the utility nodes are one of an IPv4 and an IPv6 address.

7. The system of claim 1, wherein the utility node is configured to register its network addresses with a DNS server associated with at least one of the access points with which the utility node is registered.

8. The system of claim 1, wherein the at least two access points are each configured to report at least one of the at least two network addresses associated with the registering utility node with a DNS server.

9. A method of operating a utility node to communicate in a wireless utility network, comprising:
   discovering, by the utility node, neighboring utility nodes in the wireless utility network;
   receiving, by the utility node, information on at least one of a plurality of access points of the wireless utility network from the discovered neighboring utility nodes, each of the access points respectively constituting an interface between the wireless utility network and another network which is external to the wireless utility network and through which at least one back office system communicates with the plurality of access points;
   discovering, by the utility node, at least two of the access points;
   registering, by the utility node, with the at least two discovered access points;
   obtaining, by the utility node upon registering with the at least two access points, at least two unique network addresses each respectively associated with a corresponding one of the at least two access points with which the utility node has registered; and
   providing, by the utility node, the at least two unique network addresses to the back office server, to provide the back office server with at least two routes to reach the utility node,
   wherein the at least two routes are respectively associated with a corresponding one of the at least two access points.

10. The method of claim 9, wherein the obtaining of the at least two unique network addresses includes:
    receive a corresponding registration acknowledgement message from each of the at least two access points, the registration acknowledgement messages received from each of the least at least two access points each containing at least part of a corresponding one of the at least two unique network addresses.

11. The method of claim 10, wherein each of the at least two unique network addresses received in a corresponding one of the registration acknowledgement messages is a combination of a respectively unique first number associated with a corresponding one of the at least two access points and a respectively unique second number associated with the utility node.

12. The method of claim 10, wherein the at least part of each corresponding one of the at least two unique network addresses received in a corresponding one of the registration acknowledgement messages contains a respectively unique first number associated with a corresponding one of the at least two access points, and wherein the obtaining of the at least two unique network addresses includes:

combining, by the utility node, the respectively unique first number associated with a first one of the at least two access points with a respectively unique second number associated with the utility node to obtain a first one of the at least two network addresses; and combining, by the utility node, the respectively unique first number associated with a second one of the at least two access points with the respectively unique second number associated with the utility node to obtain a second one of the at least two network addresses.

13. The method of claim 9, comprising:

calculating, by the utility node, a priority list of sending utility nodes from among the discovered neighboring utility nodes, based at least in part on the access point information received from the discovered neighboring utility nodes; and selecting, by the utility node, at least one sending utility node from among the discovered neighboring utility nodes to forward a packet to at least one of the discovered access points, based on the calculated priority list of the sending utility nodes.

14. The method of claim 9, comprising:

reporting the at least two network addresses associated with the registering utility node to a DNS server.

15. A utility node for use in a wireless utility network, comprising:

a processing unit configured to process instructions; and a communications interface for communicating with the wireless utility network, wherein:

the processing unit is configured to control the communications interface to transmit a discovery communication for discovering neighboring utility nodes in the wireless utility network; and in response to the communications interface receiving information on at least one of a plurality of access points of the wireless utility network from the discovered neighboring utility nodes, each of the access points respectively constituting an interface between the wireless utility network and another network which is external to the wireless utility network and through which at least one back office system communicates with the plurality of access points, the processing unit is configured to:

discover at least two access points constituting an interface between the wireless utility network and the other network;

control the communications interface to register with the discovered at least two access points;

obtain at least two unique network addresses each respectively associated with a corresponding one of the at least two access points with which the utility node has registered; and control the communications interface to provide the at least two unique network addresses to the back office server, to provide the back office server with at least two routes to reach the utility node, wherein the at least two routes are respectively associated with a corresponding one of the at least two access points.

16. The utility node of claim 15, wherein the processing unit of the utility node, in obtaining the at least two unique network addresses, is configured to:

upon registering with the at least two access points, control the communications interface to receive a corresponding registration acknowledgement message from each of the at least two access points, the registration acknowledgement messages received from each of the at least two access points each containing at least part of a corresponding one of the at least two unique network addresses.

17. The utility node of claim 16, wherein each of the at least two unique network addresses received in a corresponding one of the registration acknowledgement messages is a combination of a respectively unique first number associated with a corresponding one of the at least two access points and a respectively unique second number associated with the at least one of the utility nodes.

18. The utility node of claim 16, wherein the at least part of each corresponding one of the at least two unique network addresses received in a corresponding one of the registration acknowledgement messages contains a respectively unique first number associated with a corresponding one of the at least two access points, and wherein the processing unit is configured to:

combine the respectively unique first number associated with a first one of the at least two access points with a respectively unique second number associated with the utility node to obtain a first one of the at least two network addresses; and combine the respectively unique first number associated with a second one of the at least two access points with the respectively unique second number associated with the utility node to obtain a second one of the at least two network addresses.

19. The utility node of claim 15, wherein the processing unit is configured to utility node is configured to control the communications interface to register the at least two network addresses with a DNS server associated with at least one of the access points with which the utility node is registered.

20. The utility node of claim 15, wherein the processing unit is configured to:

calculate a priority list of sending utility nodes from among the discovered neighboring utility nodes, based at least in part on the access point information received from the discovered neighboring utility nodes; and select at least one sending utility node from among the discovered neighboring utility nodes to forward a packet to at least one of the discovered access points, based on the calculated priority list of the sending utility nodes.

* * * * *